United States Patent
Hardacker et al.

(10) Patent No.: US 7,965,663 B2
(45) Date of Patent: *Jun. 21, 2011

(54) METHOD AND SYSTEM FOR WIRELESS DIGITAL MULTIMEDIA TRANSMISSION

(75) Inventors: Robert Hardacker, Escondido, CA (US); David A. Desch, Poway, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1486 days.

This patent is subject to a terminal disclaimer.

(21) Appl. No.: 11/242,497

(22) Filed: Oct. 3, 2005

(65) Prior Publication Data

US 2006/0233096 A1 Oct. 19, 2006

Related U.S. Application Data

(63) Continuation of application No. 10/790,162, filed on Mar. 1, 2004, now Pat. No. 7,020,121.

(60) Provisional application No. 60/520,588, filed on Nov. 17, 2003.

(51) Int. Cl.
*H04B 7/00* (2006.01)

(52) U.S. Cl. ......... 370/310; 375/261; 725/149; 310/338

(58) Field of Classification Search ........................ None
See application file for complete search history.

(56) References Cited

U.S. PATENT DOCUMENTS

| | | | |
|---|---|---|---|
| 5,668,566 A | | 9/1997 | Yen |
| 5,757,416 A | | 5/1998 | Birch et al. |
| 5,881,107 A | | 3/1999 | Termerinac et al. |
| 6,134,223 A | * | 10/2000 | Burke et al. .................. 370/265 |
| 7,020,121 B2 | * | 3/2006 | Hardacker et al. ............. 370/338 |
| 7,349,691 B2 | * | 3/2008 | Karr et al. .................. 455/422.1 |
| 2001/0016014 A1 | | 8/2001 | Nam |
| 2003/0067552 A1 | * | 4/2003 | Leyvi et al. .................. 348/453 |
| 2003/0097662 A1 | | 5/2003 | Russ et al. |
| 2003/0145336 A1 | | 7/2003 | Matsuzaki et al. |
| 2003/0147008 A1 | | 8/2003 | Liu |
| 2003/0149987 A1 | | 8/2003 | Pasqualino et al. |
| 2003/0169831 A1 | * | 9/2003 | Neugebauer et al. ......... 375/316 |
| 2004/0131357 A1 | * | 7/2004 | Farmer et al. .................... 398/67 |
| 2004/0196920 A1 | * | 10/2004 | Loheit et al. .................. 375/281 |
| 2005/0041746 A1 | * | 2/2005 | Rosen et al. .................. 375/242 |

FOREIGN PATENT DOCUMENTS

| | | |
|---|---|---|
| JP | 2003524339 | 8/2003 |
| WO | 02/102054 | 12/2002 |

OTHER PUBLICATIONS

DDWG Promoters:"Digital Visual Interface (DVI) Revision 1.0", Apr. 2, 1999, p. 10, XP002200306.

* cited by examiner

*Primary Examiner* — Duc C Ho
(74) *Attorney, Agent, or Firm* — John L. Rogitz

(57) ABSTRACT

Digital Visual Interface (DVI), or High Definition Multimedia Interface (HDMI), data is received from a source and sent to a transmitter chip that includes a transition minimized differential signaling (TMDS) receiver that outputs a 3-data and 1-clock physical signaling stream representing the DVI or HDMI data. This stream is rendered into I and Q data by an ASIC or FPGA and sent to a wireless transmitter for modulation, upconverting, and transmission to, e.g., a nearby display device without ever rendering the data into baseband video on the transmitter chip. The display device has a receiver chip that is essentially the inverse of the transmitter chip.

7 Claims, 2 Drawing Sheets

TRANSMITTER LOGIC

RECEIVER LOGIC

METHOD AND SYSTEM FOR WIRELESS DIGITAL MULTIMEDIA TRANSMISSION

RELATED APPLICATIONS

This application is a continuation of and claims priority to U.S. patent application Ser. No. 10/790,162, filed Mar. 1, 2004, now U.S. Pat. No. 7,020,121, which in turn claims priority from U.S provisional patent application Ser. No. 60/520,588, filed Nov. 17, 2003.

FIELD OF THE INVENTION

The present invention relates generally to wireless multimedia systems.

BACKGROUND

Digital video can be transmitted from a source, such as a computer or Set Top Box (STB), to a display, such as a video monitor or entertainment display and associated audio and control functions, using one of two protocols known as Digital Visual Interface (DVI) and High Definition Multi-media Interface (HDMI). Having been developed primarily for computers, DVI, and having been developed primarily for digital displays, HDMI are intended for wired transmission.

As recognized herein, to save table space and to increase people's mobility and viewing lines in the room, it may be desirable to view the multimedia on a display using a minimum of wiring. For instance, it may be desirable to mount a projector on the ceiling or to mount a plasma display or liquid crystal high definition (HD) television display on a wall, out of the way and capable of receiving multimedia data for display without the need for wires, since as understood herein among other things, while power lines exist in ceilings and walls, data transmission lines often do not exist in ceilings or walls.

The present invention further understands, however, that not just any wireless transmission system will do. Specifically, if a wireless link such as IEEE 802.11(b, g or a) is used that has a bandwidth which is insufficient to carry uncompressed multimedia such as uncompressed high definition (HD) video, compressed multimedia video (standard definition or high definition) would have to be transmitted, requiring a relatively expensive compression module at the source and decompression module at the display. Some links such as IEEE 802.11(a) do have a bandwidth high enough to carry compressed HD video but not uncompressed SD or HD video. Also, in the case of 802.11(a) copyright protection may be implicated because the link is sufficiently long range (extending beyond the room in which it originates) that it can be detected beyond the immediate location of the transmitting device. With this in mind, the present invention recognizes the need for a very short range, preferably directional, high bandwidth wireless link that is particularly suited for the short range wireless communication of uncompressed multimedia, particularly the rather voluminous genre of multimedia known as HD video.

In any case, as mentioned above for the DVI standard, wireless transmission is not envisioned. The present invention recognizes that to effect wireless short-range transmission of DVI data, a DVI receiver chip can receive 1 clock line and 3-data physical signaling streams representing DVI clock, data and control functions and demultiplex it to baseband video of 24 bits video and 7-control lines. The baseband video can be fed into a processor that re-multiplexes the signals and produces both "in-phase", I and "quadrature", Q signals that can be up converted (modulated) by a radio and wirelessly transmitted to a DVI transmitter chip. The DVI transmitter chip can perform the inverse of the above process to produce a clock and 3-data physical signaling stream that is sent to drive a display.

As critically recognized herein, the above-discussed system, while useful, can be further simplified. Accordingly, the solution herein is provided.

SUMMARY OF THE INVENTION

A system includes a transition minimized differential signaling (TMDS) receiver on a first substrate, with the TMDS receiver being configured for receiving digital visual interface (DVI) or high definition multi-media interface (HDMI) data. A transmitter processor is on the first substrate and receives data from the TMDS receiver. The transmitter processor may be implemented a field programmable gate array (FPGA) or an application specific integrated circuit (ASIC). A wireless transmitter on the first substrate receives data from the transmitter processor for wireless transmission thereof.

The system also includes a wireless receiver configured to receive data from the wireless transmitter, and a receiver processor receiving data from the wireless receiver. Like the transmitter processor, the receiver processor may be implemented by an FPGA or ASIC. A TMDS transmitter is configured for receiving data from the receiver processor and outputting DVI input signals to a display. The preferred system thus does not reduce data to a baseband video signal during processing.

The preferred transmitter processor can include phase-locked loop circuitry for clock stabilization, de-jitter circuitry for input data stabilization, and it can apply forward error correction prior to differential encoding of data. The transmitter processor may output I and Q data to the wireless transmitter in response to 3-data and 1-clock TMDS streams received from the TMDS receiver.

In another aspect, a method for wireless transmission of video data includes receiving the video data at a physical signaling stream receiver, rendering the data into a physical signaling stream, and rendering the physical signaling stream into data suitable for modulation by a radio transmitter. The rendering acts are undertaken without rendering the data into baseband video at any time, and then the data is wirelessly transmitted. The method includes receiving the data and rendering demodulated data from the received data. Then, physical signaling stream data is rendered from the demodulated data, and these rendering acts likewise are undertaken without rendering the data into baseband video at any time. The data is output to a display device using a physical signaling stream transmitter.

In yet another aspect, a digital video transmitter includes a transmitter processor configured to receive a physical signaling stream representing digital video data and based thereon, without rendering baseband information representing the digital video data, outputting a quadrature signal suitable for processing by a wireless transmitter.

In still another aspect, a digital video receiver includes a receiver processor configured to receive a demodulated quadrature signal and based thereon, without rendering baseband information representing the digital video data, outputting a physical signaling stream representing digital video data.

The details of the present invention, both as to its structure and operation, can best be understood in reference to the

DETAILED DESCRIPTION OF THE PREFERRED EMBODIMENT

Figure 1:
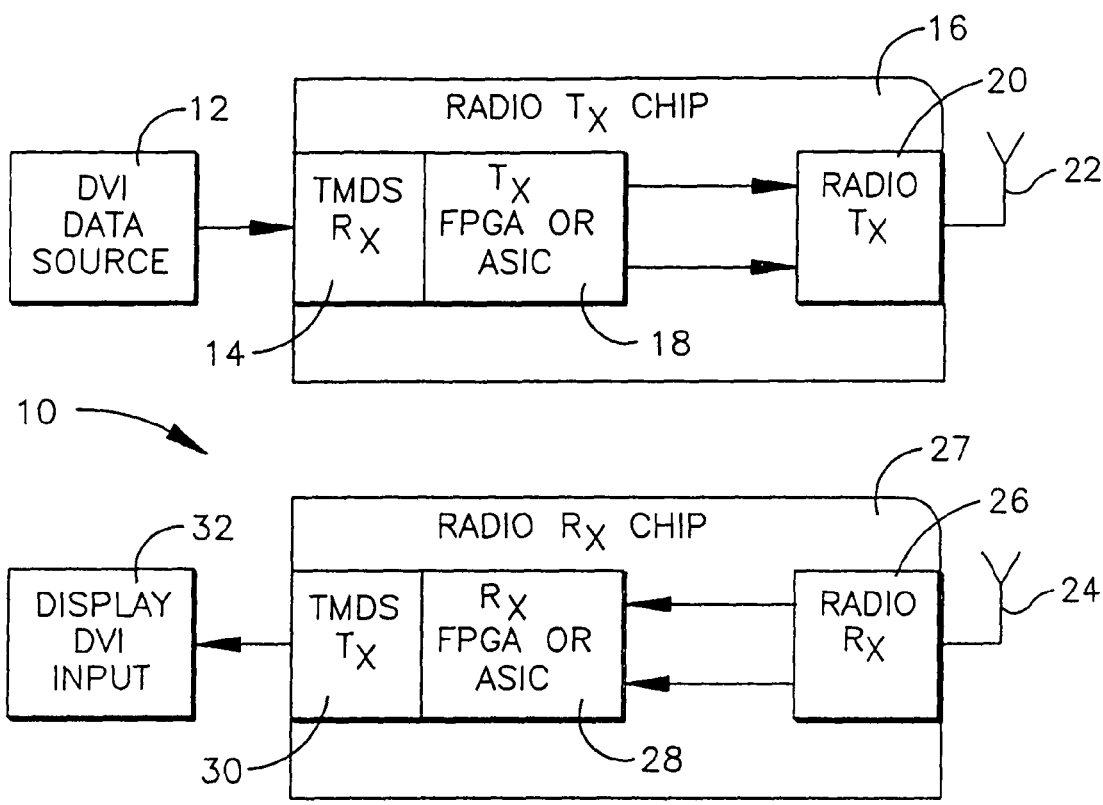
FIG. 1 is a block diagram showing the inventive system.

Referring initially to FIG. 1, a system is shown, generally designated 10, which includes a source 12 of Digital Visual Interface (DVI) or HDMI data that may be a set-top box, laptop computer or other multimedia computer or server. Or, it can be a satellite, broadcast, or cable receiver, or it can be a DVD player or other multimedia source.

The data is sent to a physical signaling receiver 14 of a transmitter board 16 that preferably contains all of its components on a single substrate. In the preferred embodiment, the receiver 14 is a transition minimized differential signaling (TMDS) receiver.

The output of the receiver 14 is sent to a transmitter processor 18 that can be implemented by an application specific integrated circuit (ASIC) or field programmable gate array (FPGA). The processor 18 processes the data in accordance with the disclosure below for wireless transmission by a wireless transmitter 20 over a transmitting antenna 22. As set forth further below, the transmitter processor 18 can, among other things, render the input data into I and Q quadrature signals such as might be required to support QPSK, DQPSK, or similar modulation by the wireless transmitter 20. Additional control signals for the display may also be multiplexed within the video data stream. Also, error correction may be implemented that is appropriate for wireless transmission in accordance with wireless transmission principles known in the art, and data encryption can be employed if desired.

In any case, the multimedia data is wirelessly transmitted over a wireless link to a receiver antenna 24, which sends the data to a wireless receiver 26 of a receiver board 27 that preferably contains all of its components on a single substrate. In accordance with present principles, the link carries a frequency which is sufficiently high that the signal on the link substantially cannot be received outside the room. Also, multimedia may be transmitted in an uncompressed form on the link such that so much data is transmitted each second that bootlegging the content is essentially untenable, although some data compression less preferably may be implemented. The data may also be transmitted in compressed form if desired. The transmitter 20 and receiver 26 (and, hence, the link there between) preferably operate at a fixed (unvarying, single-only) frequency of approximately sixty Gigahertz (60 GHz), and more preferably in the range of 59 GHz-64 GHz, and the link has a data rate, preferably fixed, of at least two Giga bits per second (2.0 Gbps). When DQPSK is used the data rate may be 2.2 Gbps, and the link may have a data rate of approximately 2.5 Gbps. The link may have a fixed bandwidth of two and half Gigahertz (2.5 GHz).

With this in mind, it may now be appreciated that the wireless transmitter 20 preferably includes an encoder for encoding in accordance with principles known in the art. The data is modulated at approximately 30 GHz by a 30.125 GHz modulator and up converted by a subharmonic mixer to a frequency of approximately 60 GHz for transmission over the link 30. Using the above-described wide channel and a simpler modulation scheme such as but not limited to DQPSK, QPSK, BPSK or 8-PSK, a high data rate yet simple system can be achieved. For example, when DQPSK is used, a data rate of twice the symbol rate can be achieved. For 8-PSK a data rate of 3.3 Gbps may be achieved.

It may further be appreciated that the wireless receiver 26 includes circuitry that is complementary to the wireless transmitter 20, namely, a downconverter, a 60 GHz demodulator, and a decoder. In any case, I and Q data from the wireless receiver 26 is sent to a receiver processor 28 for error correction and for recovering the 3-data physical signaling stream from the I and Q data. The receiver processor 28 may be implemented by, e.g., an ASIC or FPGA. The output of the receiver processor 28 is sent to a TMDS transmitter 30, which sends the data over a cable or other wire to a display device 32 that may be part of a media player such as a DVD player or TV or other player. The display device 32 decrypts the multimedia data (if encrypted) and presents the data on a display such as a cathode ray tube (CRT), liquid crystal display (LCD), plasma display panel (PDP), or TFT, or projector with screen, etc.

The skilled artisan can now appreciate that the system 10 does not include a full DVI or HDMI receiver in the transmitter chip 16 or a full DVI or HDMI transmitter in the receiver chip 27. Thus, the system 10 does not derive or render twenty four lines of baseband video and control signals from the 3-data and 1-clock TMDS stream received from the source 12, nor does it render baseband video from the I and Q signals received over the wireless link from the transmitter 16 prior to outputting data to the display device 32.

According to the present invention, the components (14 and 18) of the transmitter 16 may be contained on a single chip, or on separate substrates. Indeed, the transmitter 16 may be integrated into the source 12. Likewise, the components (28 and 30) of the wireless receiver 27 may be implemented on a single chip and may be integrated into the display device 32 if desired.

Figure 2:
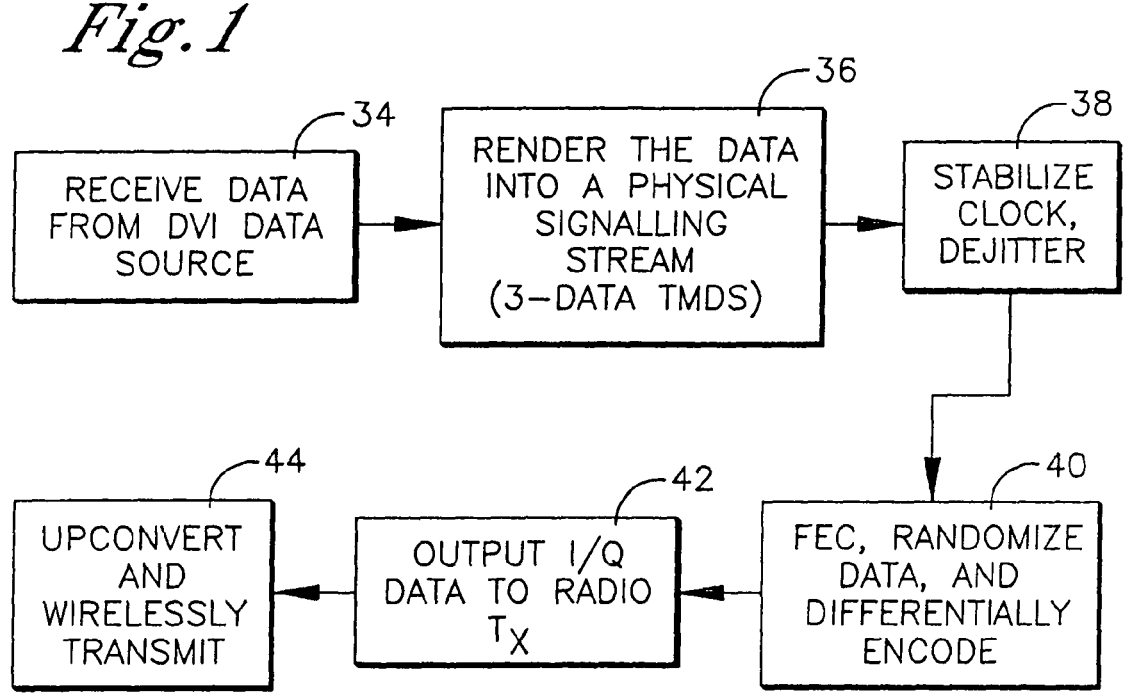
FIG. 2 is a flow chart of the present transmitter logic.
Figure 3:
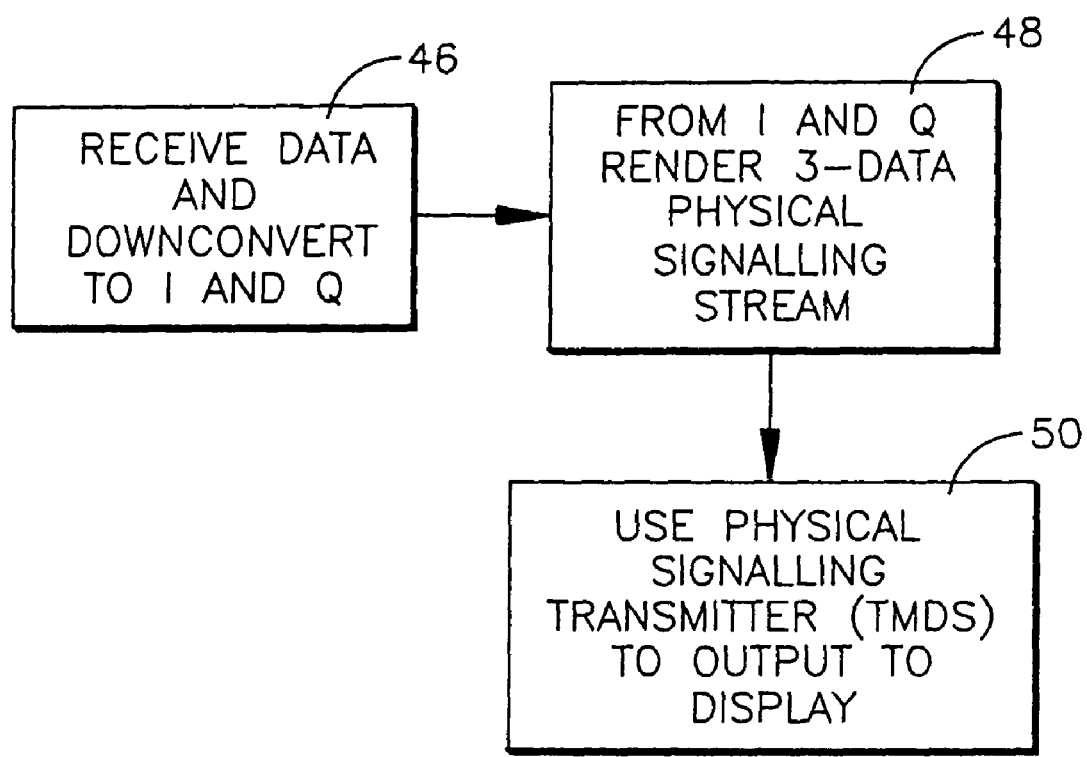
FIG. 3 is a flow chart of the present receiver logic.

FIGS. 2 and 3 illustrate the operation of the transmitter 16 and receiver 27, respectively. Commencing at block 34 in FIG. 2, DVI data is received from the source 12 and rendered into a 3-data physical signaling stream by the TMDS receiver 14 at block 36. The data is sent to the transmitter processor 18 which, at block 38, uses phase-locked loop (PLL) principles known in the art to stabilize the signal clock, and which also applies de-jitter to the signal in accordance with de-jitter principles known in the art. At block 40 the stabilized 3-data and 1-clock physical streams are multiplexed into 2 streams. Also, if desired the transmitter processor 18 can, at block 40, apply forward error correction (using, e.g., Reed-Solomon principles), randomize the data, and differentially encode the data.

Block 42 indicates that importantly, the processor 42 renders the 3-data physical signaling stream into I and Q quadrature modulation input data, which is input to the radio transmitter 20. At block 44, the radio transmitter 20 up converts the data and wirelessly transmits it in accordance with wireless transmission principles known in the art.

Now referring to FIG. 3, at block 46 the data is received by the wireless receiver 26 and downconverted to I and Q data. The I and Q data is sent to the receiver processor 28, which, at block 48, demultiplexes and renders it into 3-data and 1-clock physical signaling stream (and which can undertake conventional functions if desired, such as decryption, etc.). The 3-data physical signaling stream is sent to the TMDS transmitter 30, which sends it to the display device 32 for display at block 50.

While the particular METHOD AND SYSTEM FOR WIRELESS DIGITAL MULTIMEDIA TRANSMISSION as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for" or, in the case of a method claim, the element is recited as a "step" instead of an "act". Absent express definitions herein, claim terms are to be given all ordinary and accustomed meanings that are not irreconcilable with the present specification and file history.

We claim:

1. A method for wireless transmission of video data, comprising:
    receiving the video data at a physical signaling stream receiver;
    rendering the video data into a physical signaling stream;
    rendering the physical signaling stream into first data suitable for modulation by a radio transmitter;
    wirelessly transmitting the first data;
    receiving the first data;
    rendering demodulated data from the received first data;
    rendering physical signaling stream data from the demodulated data, the rendering acts being undertaken without rendering the data into baseband video at any time; and
    outputting the data to a display device using a physical signaling stream transmitter, wherein the physical signaling stream is a 3-data and 1-clock TMDS stream and the physical signaling stream receiver is a transition minimized differential signaling (TMDS) receiver and further wherein the first data suitable for modulation by a radio transmitter that is rendered from the physical signaling stream is I and Q data.

2. A digital video transmitter, comprising:
    at least one transmitter processor configured to receive a physical signaling stream representing digital video data and based thereon outputting a quadrature signal suitable for processing by a wireless transmitter, wherein the physical signaling stream is a 3-data and 1-clock TMDS stream and the digital video transmitter is a transition minimized differential signaling (TMDS) transmitter and further wherein the digital video data is I and Q data.

3. The digital video transmitter of claim 2, wherein the processor is an ASIC.

4. The digital video transmitter of claim 2, wherein the processor is an FPGA.

5. A digital video receiver, comprising:
    at least one receiver processor configured to receive a demodulated quadrature signal and based thereon outputting a physical signaling stream representing digital video data, wherein the physical signaling stream is a 3-data and 1-clock TMDS stream and the digital video receiver is a transition minimized differential signaling (TMDS) receiver and further wherein the digital video data is I and Q data.

6. The digital video receiver of claim 5, wherein the processor is an ASIC.

7. The digital video receiver of claim 5, wherein the processor is an FPGA.

* * * * *